Patented Apr. 11, 1950

2,503,282

UNITED STATES PATENT OFFICE 2,503,282

FOOD PRODUCTS OF COMMINUTED ANIMAL TISSUE

Archibald L. Lynne, Chicago, Ill.

No Drawing. Application April 17, 1946,
Serial No. 662,926

14 Claims. (Cl. 99—107)

The present invention relates to foods; and more particularly to food products that undergo a process of grinding, chopping, shredding, stripping or some other form of comminution in preparation before being molded into cakes or loaves or other convenient shapes prior to further processing or consumption. More specifically, my invention relates to new food products of comminuted animal tissue, and a method of manufacture thereof, in shaped or molded forms that possess improved qualities of consistency, homogeneity and cohesion.

While the present invention is discussed below with some emphasis upon its embodiment in fish products, it is understood that such emphasis derives from choice of illustration only, and in no way limits the scope of my invention as defined in the claims appended below.

It is well known that a large proportion of the catch of commercial fishermen is rejected as unmarketable for food purposes. This discard does not consist entirely of inedible fish; in fact, the far greater percentage is fish that is flavorsome and nutritious. The discarded fish merely are of inconvenient size or shape or are of a species unfamiliar to consumers, and thus have no sales value. The resultant waste is enormous.

It is apparent that such waste could be prevented by the development of a palatable food product composed of the ground flesh of various species of fish mixed together; molded into a patty, cake or loaf; seasoned; and cooked or canned before consumption. In the past, however, difficulty has been encountered in forming comminuted fish tissue into shapes convenient for processing and consumption. For example, if the flesh of various species of fish is ground, mixed and cooked together without the use of a binder, the resulting product will not remain in a loaf form but instead falls apart and presents an appearance suggestive of dry sawdust. Binders such as starches, sugars, gums and sticky fluids have not proved satisfactory. So much binder is required that the taste and the physical and nutritional qualities of the product are appreciably altered for the worse.

Comminuted meat or fowl products likewise present the problem discussed above. It is well-known, for instance, that housewives add eggs to hamburgers to act as an agglutinizing agent. Or the hamburgers are filled with cereal, bread, or other bulky material for the same purpose. Boned chicken is customarily held together by the addition of gelatin. These binders all have disadvantages. Eggs are expensive, and alter the taste of the hamburger. Bulky fillers dilute the flavor and substantially reduce the nutritive value of the hamburger. And gelatin, which is made from the hooves and hides of various animals, arouses dietary scruples in many persons.

I have discovered that if a small amount of yeast, preferably hydrolyzed yeast or better still autolyzed yeast, is added to a loose, non-cohesive mixture such as ground fish, the mixture becomes sufficiently glutinous to be molded into coherent cakes or loaves. A similar property inheres in food products of comminuted meat, fowl or similar animal tissue containing small amounts of added autolyzed yeast. Furthermore, this effect is not temporary, nor is it dissipated by further processing such as cooking. Remarkable increases in cohesive property may be observed in my new products which contain only very small amounts of autolyzed yeast. For example, a ground fish meal of trout, herring, pike and pickerel, to which only 0.4% by weight of autolyzed yeast is added, is thereby changed from a wet mixture wherein the water rises to the top, to a coherent mass that is stabilized and does not tend to separate. Cooking a mixture of this ground fish meal and autolyzed yeast results in a fine embodiment of my invention; a food product of comminuted fish tissue which has a consistency like fresh summer sausage, and which may be cut and spread with a silver table knife.

Broadly, my invention contemplates the incorporation of plasmolyzed yeast products in comminuted animal tissue to increase the cohesive properties thereof. I prefer the use of the variety of plasmolyzed yeast known as autolyzed yeast having properties hereinafter specified. Hydrolyzed yeast may also be used although it is less effective than autolyzed yeast and although some hydrolyzed yeast products impart a bitter taste to foods.

Food products prepared according to the teaching of my invention embody many advantages to both manufacturer and consumer. Manufacturing processes are simpler and more efficient when a conveniently-shaped, cohesive mass of material may be handled. Syneresis is minimized in my products and there is less shrinkage during storage and cooking. My products are easier to cook, and may be served in a greater variety of attractive modes than foods which tend to fall apart. My products retain the flavor and nutritional characteristics of fish, meat or fowl, tastily seasoned as the case may be, since only very small amounts of autolyzed yeast are incorporated therewith. The remarkable potency of such small amounts of autolyzed yeast as an agglutinizing agent makes my products inexpensive and my method of manufacture commercially practicable. Autolyzed yeast is principally protein and, in fact, adds to the nutritional value of the food in which it is used. It also contains the vitamins thiamine, riboflavin and niacin in substantial amounts. Autolyzed yeast has a nutty, meaty savor and a preferred method of manufacture contemplated by my invention is the addition of autolyzed yeast to a food product as a component of the flavoring or seasoning thereof. When incorporated in fish products, autolyzed yeast is effective minimizing the fishy odor of said products.

A principal object of my invention, therefore, is to provide new food products comprising essentially comminuted animal tissue in convenient shaped masses that may be handled or further processed without crumbling or breaking.

Another important object of my invention is to provide a simple and inexpensive process for increasing the glutinous qualities of food products made from comminuted animal tissue.

In this specification and the appended claims the term "comminuted" is used to describe any food product that is chopped, ground, shredded or in any other way processed to divide said food into fragments. The term is also used to include foods wherein such process of fragmentation merely involves the stripping of edible flesh from bones, such as boned chicken or boned fish, since such boned flesh tends to fall apart when handled or processed.

Autolyzed yeast is produced as a commercial product, preferred for the purposes of my invention, in the following manner. Primary yeast, as defined in U. S. Pharmacopoeia, XII Revision, First Bound Supplement, is grown in a culture medium of molasses and grain extractives. The primary yeast is separated from its culture medium and washed with water. The washed yeast is treated with salt (NaCl) which draws out the cell juice. As this occurs the proteolytic enzymes naturally present in the yeast act upon the cell protein itself and render it soluble. This autolysis is a natural enzymatic process which is accelerated by control of environmental conditions. This process is continued until most of the insoluble proteins have been converted to soluble peptones, peptides, polypeptids and amino-acids. The process is then stopped by mild heating and the solution is filtered. The soluble fraction is concentrated under vacuum and then spray dried. The resultant product is an autolyzed yeast powder having the following average composition:

| | Per cent |
|---|---|
| Moisture | 2–3 |
| Protein | 35–40 |
| Total ash | 46–51 |
| Salt | 45–50 |

The actual autolyzed years content, therefore, of this powder is approximately 40%.

Hydrolyzed yeast is produced by the digestion of primary yeast with strong acids or alkalis, followed by neutralization. It differs from autolyzed yeast in that the latter is enzymatically digested. The term "plasmolyzed yeast" is used generically in this specification and the appended claims to define yeast products resulting from digestion of the cell protein in primary yeast regardless of the agent used to accomplish the assimilation. Thus used, the term "plasmolyzed yeast" includes both hydrolyzed yeast and autolyzed yeast.

In this specification the term "autolyzed yeast powder" means commercial yeast powder prepared in the manner and having the composition specified above. In the appended claims the term "autolyzed yeast" means any yeast product prepared by the enzymatic digestion of primary yeast. In this specification and the appended claims the term "autolyzed yeast" used with a percentage figure means actual yeast content. Percentage figures used herein are calculated on the weight of the finished product.

In order to enable those skilled in the art of food manufacture to fully understand the nature of my invention, the following illustrations are given of my new food products and the method of preparing them. It is understood, however, that the proportions of the various ingredients, the various manipulative details and the nature of the product obtained may all be varied without departing from the spirit of my invention. The following examples, therefore, are to be taken in an illustrative rather than a limitative sense, the scope of my invention being coextensive with the scope of this patent as defined in the appended claims.

EXAMPLE I

*Fresh water fish loaf*

| | Pounds |
|---|---|
| Trout fillets | 15 |
| Lake herring fillets | 10 |
| Pike fillets | 5 |
| Carp fillets | 40 |
| Pickerel fillets | 4 |
| Seasoning | 1.1 |

The fish are coarsely ground and mixed together. The seasoning is then added. By way of example, said seasoning may consist of:

*Seasoning*

| | Percent |
|---|---|
| Autolyzed yeast powder | 96 |
| Ground celery seed | 2 |
| Corn oil | 1.5 |
| Dehydrated onions | 1 |
| Parsley powder | 0.3 |
| Garlic powder | .01 |
| Marjoram | Trace |

This seasoning is thoroughly mixed into the ground fish. The ground and seasoned fish may then he shaped into patties, deep-frozen and sold cold-packed for frying. When the frozen patties are thawed for cooking they will retain their shape and will not fall apart in the cooking vessel. Alternatively, the ground fish may be packed into cans and retorted with pressurized steam at a temperature of approximately 240° F. for about two hours. In either case, in the patties or in the loaves from the cans, the product will have a marked consistency, homogeneity and cohesion of structure; there will be practically no separation of moisture or oil, and the product may be cut, served and consumed easily and conveniently.

EXAMPLE II

Salt water fish patties

| | Pounds |
|---|---|
| Frozen cod fillets | 10 |
| Autolyzed yeast powder | 0.1 |
| Seasoning—To taste. | |

The cod fillets are thawed, coarsely ground and the seasoning (any desired spices) is mixed with the ground fish. The autolyzed yeast may be added before, after or with the seasoning. The seasoned fish mixture to which the autolyzed yeast has been added is shaped into patties and the patties are fried. The patties will remain firmly consistent throughout the cooking process, and there will be no fishy odor clinging to the hands of the person handling the patties.

The seasoning of the patties may be varied to taste as I have found that the type and quantity of seasoning has no effect upon the ability of the autolyzed yeast to produce the desired result. Mixed vegetables may be used with the ground fish and the proportion of autolyzed yeast may be lowered to as little as 0.1% by weight which will still be sufficient to yield a patty of satisfactory cohesive properties. The amount of autolyzed yeast powder I use increases with the oil and fat content of the fish. Generally 1% of actual yeast content which is equivalent to approximately 2+% of the commercial autolyzed yeast powder is ample for any commercial situation. However, this does not mean that my invention is inoperative above said limit, but merely that greater proportions of autolyzed yeast are not justified by any further desirable result other than to accentuate flavoring.

EXAMPLE III

Hamburger

| | Pounds |
|---|---|
| Beef hamburger | 100 |
| Hydrolyzed yeast | 5 |
| Seasoning—To taste. | |

A hamburger product to which approximately 5% hydrolyzed yeast has been added will be moist and of a firm texture after cooking, whereas the same meat formed into hamburger patties without the addition of hydrolyzed yeast will crumble and fall apart while being cooked. The hydrolyzed yeast imparts a slight bitter taste to the hamburger, which, however, is sufficiently covered up by spices and flavoring normally added to the meat.

EXAMPLE IV

Hamburger

| | Pounds |
|---|---|
| Beef hamburger | 100 |
| Autolyzed yeast powder | 1 |
| Seasoning—To taste (1 lb.). | |

A hamburger product containing the proportion of autolyzed yeast specified above will have a firm consistency and will not fall apart while being cooked. The nutty flavor of the autolyzed yeast powder accentuates the meaty flavor of the hamburger.

EXAMPLE V

Boned chicken

| | Pounds |
|---|---|
| Boiled and boned chicken | 100 |
| Autolyzed yeast powder | 1.5 to 2 |
| Seasoning—To taste. | |

When the autolyzed yeast powder is mixed with the boned chicken, the fragments of chicken will cohere in loaf form, thereby obviating the addition of gelatin to the product. My product will contain considerably more chicken per pound of finished product, and will present a considerably more appetizing appearance than chicken bound with gelatin.

The foregoing examples will enable food manufacturers to utilize my invention in a wide range of food products. From the foregoing it is evident that I have invented novel and useful methods of increasing the cohesive property of comminuted animal tissue, and that I have discovered many new food products which may be prepared by employing the aforesaid methods.

I claim:

1. The method of increasing the coherence of a loaf of comminuted animal tissue without otherwise sensibly altering the same, which comprises incorporating not more than about five per cent of autolyzed yeast therewith.

2. The process of making coherent masses, which comprises adding to comminuted raw animal tissue not less than 0.1% nor more than 5% by weight of autolzed yeast as an agglutinizing agent.

3. The process of making fish loaves which comprises mixing comminuted raw fish with not more than 5% by weight of autolyzed yeast, thereby creating a coherent mixture.

4. The method of agglutinizing comminuted animal tissue without otherwise sensibly altering the same, which comprises adding plasmolyzed yeast thereto in amount not less than about 0.1% and not more than about 5%.

5. The method of enhancing the cohesiveness of comminuted animal tissue without otherwise sensibly altering the same, which comprises adding hydrolyzed yeast thereto in amount not less than about 0.1% and not more than about 5%.

6. The method of increasing the coherence of a shaped mass of comminuted raw meat without otherwise sensibly altering the same, which comprises incorporating not less than about one percent nor more than above five percent of plasmolyzed yeast therewith.

7. The method of increasing the coherence of boned fowl without otherwise sensibly altering the same, which comprises incorporating not more than about two percent of autolyzed yeast therewith.

8. A food loaf comprising comminuted animal tissue and plasmolyzed yeast in amount not less than about 0.1% nor more than about 5% of the weight of said animal tissue.

9. A relatively coherent shaped article of food, comprising comminuted animal tissue and autolyzed yeast in amount not less than about 0.1% nor more than about 5% of the weight of said animal tissue.

10. A coherent article of food comprising comminuted raw animal tissue intimately intermixed with not less than 0.1% nor more than 5% of hydrolyzed yeast.

11. A fish loaf comprising comminuted fish admixed with plasmolyzed yeast in amount not less than about 0.1% nor more than about 5% of the weight of said fish.

12. A fish loaf comrising an intimate intermixture of comminuted fish and autolyzed yeast in amount not less than about 0.1% nor more than about 5% of the weight of said fish.

13. A meat loaf comprising comminuted meat and autolyzed yeast in amount not less than about one percent nor more than about five percent of the weight of said meat.

14. A coherent article of food, comprising boned fowl and not more than about two percent of autolyzed yeast mixed therewith.

A. L. LYNNE.

REFERENCES CITED

The following references are of record in the file of this patent:

UNITED STATES PATENTS

| Number | Name | Date |
|---|---|---|
| 1,611,531 | Kahn et al. | Dec. 21, 1926 |
| 1,851,253 | Kahn | Mar. 29, 1932 |
| 2,141,455 | Weizmann | Dec. 27, 1938 |

FOREIGN PATENTS

| Number | Country | Date |
|---|---|---|
| 20,832 of 1906 | Great Britain | June 27, 1907 |

OTHER REFERENCES

"Food Manufacture," March 1943, pages 91 and 92.